US012626098B2

(12) United States Patent
Brito et al.

(10) Patent No.: US 12,626,098 B2
(45) Date of Patent: May 12, 2026

(54) METHOD AND SYSTEM FOR CREATING AN ENSEMBLE OF NEURAL NETWORK-BASED CLASSIFIERS THAT OPTIMIZES A DIVERSITY METRIC

(71) Applicant: Palo Alto Research Center Incorporated, Palo Alto, CA (US)

(72) Inventors: Alejandro E. Brito, Mountain View, CA (US); Shantanu Rane, Palo Alto, CA (US)

(73) Assignee: Genesee Valley Innovations, LLC, Santa Clara, CA (US)

( * ) Notice: Subject to any disclaimer, the term of this patent is extended or adjusted under 35 U.S.C. 154(b) by 904 days.

(21) Appl. No.: 17/945,623

(22) Filed: Sep. 15, 2022

(65) Prior Publication Data

US 2024/0095496 A1    Mar. 21, 2024

(51) Int. Cl.
| | |
|---|---|
| *G06N 3/045* | (2023.01) |
| *G06F 18/2433* | (2023.01) |
| *G06N 3/08* | (2023.01) |
| *G06N 20/20* | (2019.01) |

(52) U.S. Cl.
CPC ......... *G06N 3/045* (2023.01); *G06F 18/2433* (2023.01); *G06N 3/08* (2013.01)

(58) Field of Classification Search
CPC .......... G06N 3/045; G06N 3/08; G06N 20/20; G06N 3/0455; G06N 3/0895; G06N 3/09; G06N 3/091; G06N 3/092; G06N 3/094; G06N 3/096; G06N 3/098; G06N 3/0985; G06F 18/2433; G06F 18/254
See application file for complete search history.

(56) References Cited

U.S. PATENT DOCUMENTS

| | | | |
|---|---|---|---|
| 10,719,301 B1 * | 7/2020 | Dasgupta | .................. G06F 8/33 |
| 2011/0302111 A1 | 12/2011 | Chidlovskii | |
| 2024/0273342 A1 * | 8/2024 | Tawara | .................. G06N 3/045 |

OTHER PUBLICATIONS

Pang et al., Improving Adversarial Robustness via Promoting Ensemble Diversity, May 29, 2019, https://arxiv.org/pdf/1901.08846 (Year: 2019).*

(Continued)

*Primary Examiner* — Kakali Chaki
*Assistant Examiner* — Molly C Sippel
(74) *Attorney, Agent, or Firm* — Yao Legal Services, Inc.; Shun Yao

(57) ABSTRACT

One embodiment provides a system which facilitates construction of an ensemble of neural network-based classifiers that optimize a diversity metric. During operation, the system defines a diversity metric based on pairwise angles between decision boundaries of three or more affine classifiers. The system includes the diversity metric as a regularization term in a loss function optimization for designing a pair of mutually orthogonal affine classifiers of the three or more affine classifiers. The system trains one or more neural networks such that parameters of the one or more neural networks are consistent with parameters of the affine classifiers to obtain an ensemble of neural network-based classifiers which optimize the diversity metric. The system predicts an outcome for a testing data object based on the obtained ensemble of neural-network based classifiers which optimize the diversity metric.

20 Claims, 10 Drawing Sheets

(56) References Cited

OTHER PUBLICATIONS

Hafiz et al., Digit Image Recognition Using an Ensemble of One-Versus-All Deep Network Classifiers, Oct. 31, 2020, https://arxiv.org/abs/2007.01192 (Year: 2020).*

Martin et al., Toward Effective Moving Target Defense Against Adversarial AI, MILCOM 2021—2021 IEEE Military Communications Conference (MILCOM), San Diego, CA, USA, 2021, pp. 993-998, doi: 10.1109/MILCOM52596.2021.9652915. (Year: 2021).*

Yin et al., Learning to Diversify via Weighted Kernels for Classifier Ensemble, Jun. 4, 2014, https://arxiv.org/abs/1406.1167 (Year: 2014).*

Tsoumakas, Grigorios, Ioannis Katakis, and Ioannis Vlahavas. "Effective and efficient multilabel classification in domains with large number of labels." Proc. ECML/PKDD 2008 Workshop on Mining Multidimensional Data (MMD'08). vol. 21. 2008. (Year: 2008).

Similarity-based Multi-label Learning taken from https://arxiv.org/pdf/1710.10335v1 .pdf (Year: 2017).

Ml-knn: A Lazy Learning Approach toMulti-Label Learning taken from http://citeseerx.ist.psu.edu/viewdoc/download?doi=10.1.1.89. 7148&rep=rep1&type=pdf (Year: 2007).

Score Normalization and Aggregation for Active Learning in Multilabel Classification taken from https://www.researchgate.net/publication/222089355_Score_Normalization_and_Aggregation_for_Active_Learningjn_Multi-label_Classification (Year: 2010).

Ml-Clubas: A Multi Label Bug Classification Algorithm taken from https://file.scirp.org/Html/2-9301529_26203.htm (Year: 2012).

A Fuzzy Similarity-Based Approach for Multi-label Document Classification taken from https://www.researchgate.net/publication/232625068_A_Fuzzy_Similarity-Based_Approach_for_Multi-labeLDocument_Classification (Year: 2009).

Madhieh Abbasi et al. "Robustness to Adversarial Examples Through and Ensemble of Specialists" Computer Vision and Systems Laboratory, Electrical and Computer Engineering Department Universite Laval, Quebec, Canada, Mar. 10, 2017.

Naveed Akhtar et al. "Threat of Adversarial Attacks on Deep Learning in Computer Vision: A Survey", School of Computer Science and Software Engineering, University of Western Australia, Feb. 26, 2018.

Maria-Florina Balcan et al. "Agnostic Active Learning", Jun. 13, 2008.

Alexander Bagnall et al. "Training Ensembles to Detect Adversarial Examples", Dec. 11, 2017.

Battista Biggio et al. "Wild Patterns: Ten Years After the Rise of Adversarial Machine Learning", Jul. 19, 2018.

Anirban Chakraborty et al. "Adversarial Attacks and Defences: A Survey", Sep. 28, 2018.

Nicholas Carlini et al. "Towards Evaluating the Robustness of Neural Networks", Mar. 22, 2017.

Yoav Freund et al. "Selective Sampling Using the Query by Committee Algorithm", Machine Learning, 28, 133-168 (1997), 1997 Kluwer Academic Publishers.

Ian J. Goodfellow et al. "Explaining and Harnessing Adversarial Examples", Mar. 20, 2015.

Steve Hanneke "Rates of Convergence in Active Learning", The Annals of Statistics, 2011, vol. 39, No. 1, 333-361, nstitute of Mathematical Statistics, 2011.

Haym Hirsh "Theoretical Underpinnings of Version Spaces", Computer Science Department Rutgers University, tew Brunswick, NJ.

Ralf Herbrich et al. "Bayes Point Machines", 2001.

Kebana "Robust Arrangements of Classifiers in Version Space".

Qiang Liu "A Survey on Security Threats and Defensive Techniques of Machine Learning: A Data Driven View", IEEE Feb. 2018.

Yu Li "On the Decision Boundary of Deep Neural Networks", Jan. 1, 2019.

Tessa Lau "Programming by Demonstration Using Version Space Algebra", Machine Learning, 53,111-156, 2003.

Tom M. Mitchell "Generalization as Search", Computer Science Department, Rutgers University.

Seyed-Mohsen Moosavi-Dezfooli "DeepFool: a simple and accurate method to fool deep neural networks" Jul. 4, 2016.

Aamir Mustafa "Adversarial Defense by Restricting the Hidden Space of Deep Neural Networks" Jul. 28, 2019.

Nicolas Papernot "Distillation as a Defense to Adversarial Perturbations against Deep Neural Networks" IEEE 2016, Mar. 14, 2016.

Shantanu Rane "A Version Space Perspective on Differentially Private Pool-Based Active Learning", Downloaded Aug. 28, 2020.

Daniel Soudry "The Implicit Bias of Gradient Descent on Separable Data", Journal of Machine Learning Research 19(2018), Dec. 28, 2018.

Uiawei Su "One Pixel Attach for Fooling Deep Neural Networks" Oct. 17, 2019.

Yichuan Tang "Deep Learning using Linear Support Vector Machines", Feb. 21, 2015.

Simon Tong "Support Vector Machine Active Learning with Applications to Text Classification", Journal of Machine .Learning Research (2001).

Florian Tramer "Ensemble Adversarial Training: Attacks and Defenses" ICLR 2018, Apr. 26, 2020.

Yan Zhou "Breaking Transferability of Adversarial Samples with Randomness", Jun. 17, 2018.

* cited by examiner

| | Single | NO DIVERSITY 802 | | | DIVERSITY 804 | | |
| | 810 | Multi-Head (Multiclass) 812 | Multi-Model (Multiclass) 814 | Multi-Model (One-vs-All) 816 | Multi-Head Diversity (Multiclass) 818 | Multi-Model Diversity (Multiclass) 820 | Multi-Model Diversity (One-vs-All) 822 |
|---|---|---|---|---|---|---|---|
| Clean 830 | 98.22 | 98.3 | 98.67 | 98.41 | 98.08 | 98.58 | 98.41 |
| | | | $\varepsilon = 0.05$ | | | | |
| FGM 832 | 91.77 | 93.18 | 95.29 | 97.59 | 92.18 | 94.55 | 97.57 |
| PGD 834 | 91.55 | 93.12 | 95.26 | 97.53 | 92.45 | 94.46 | 97.52 |
| | | | $\varepsilon = 0.1$ | | | | |
| FGM 836 | 52.4 | 63.53 | 74.8 | 94.24 | 65.42 | 75.75 | 94.78 |
| PGD 838 | 51.53 | 64.12 | 73.13 | 92.81 | 66.04 | 74.62 | 93.53 |
| | | | $\varepsilon = 0.2$ | | | | |
| FGM 840 | 25.86 | 25.26 | 48.88 | 69.23 | 29.63 | 32.71 | 71.48 |
| PGD 842 | 26.21 | 28.39 | 46.96 | 66.88 | 29.68 | 33.86 | 68.93 |
| | | | $\varepsilon = 0.3$ | | | | |
| FGM 844 | 20.78 | 18.91 | 34.98 | 51.86 | 19.67 | 19.84 | 55.15 |
| PGD 846 | 22.23 | 22.37 | 33.79 | 51.11 | 19.79 | 22.87 | 52.89 |

800

850 852 854 856 858 860

| Database | Models | Mean Angle | Min Angle | Max Angle | Std. Dev of Angle | Median Angle |
|---|---|---|---|---|---|---|
| MNIST | CNN 2-layer (Baseline) | 90.59 | 77.01 | 106.67 | 4.37 | 90.68 |
| MNIST | CNN 2-layer (Diversity Opt λ = 0.1) | 90 | 89.92 | 90.07 | 0.02 | 90 |
| CIFAR | CNN 6-layer (Baseline) | 89.17 | 90.21 | 73.02 | 4.78 | 90.07 |
| CIFAR | CNN 6-layer (Diversity Opt λ = 0.1) | 90.00 | 90.29 | 89.51 | 0.05 | 90 |

METHOD AND SYSTEM FOR CREATING AN ENSEMBLE OF NEURAL NETWORK-BASED CLASSIFIERS THAT OPTIMIZES A DIVERSITY METRIC

RELATED APPLICATIONS

This application is related to:

U.S. application Ser. No. 17/158,631, entitled "System and Method for Reasoning About the Diversity and Robustness of an Ensemble of Classifiers," by inventors Shantanu Rane, Alejandro E. Brito, and Hamed Soroush, filed 26 Jan. 2021 (hereinafter "application. Ser. No. 17/158,631");

U.S. application Ser. No. 17/345,996, entitled "Method and System for Creating an Ensemble of Machine Learning Models to Defend Against Adversarial Examples," by inventors Alejandro E. Brito, Bashir Sadeghi, and Shantanu Rane, filed 11 Jun. 2021 (hereinafter "application. Ser. No. 17/345, 996");

U.S. application Ser. No. 17/400,016, entitled "Method and System for Learning an Ensemble of Neural Network Kernel Classifiers Based on Partitions of the Training Data," by inventors Alejandro E. Brito, Bashir Sadeghi, and Shantanu Rane, filed 11 Aug. 2021 (hereinafter "application. Ser. No. 17/400,016"); and U.S. application Ser. No. 17/944,939, entitled "Method and System for Optimizing a Pair of Affine Classifiers Based on a Diversity Metric," by inventors Shantanu Rane, Bashir Sadeghi, and Alejandro E. Brito, filed 14 Sep. 2022 (hereinafter "application. Ser. No. 17/944,939")

the disclosures of which are herein incorporated by reference in their entirety.

BACKGROUND

Field

This disclosure is generally related to machine learning and data classification. More specifically, this disclosure is related to a method and system for creating an ensemble of neural network-based classifiers that optimizes a diversity metric.

Related Art

In the field of machine learning, adversarial examples can exploit the way that artificial intelligence algorithms work in order to disrupt the behavior of the algorithms. Recently, an increasing number and types of attacks have been devised in order to fool the algorithms, along with increasingly stronger defenses against such attacks. One large class of these attacks is "perturbation-bounded evasion attacks," which involve adversarial examples constructed by perturbing data samples with the goal of forcing a classifier to misclassify them. Such evasion attacks comprise a predominant class of attacks considered in current machine learning technology. One specific type of evasion attack involves adversarial examples which can be trivially classified by a human but can fool a machine learning classifier.

One solution to address these evasion attacks is to use an ensemble or collection of classifiers. However, a principled analysis based on linear models derived from convolutional neural networks (CNNs) remains a challenge.

SUMMARY

One embodiment provides a system which facilitates construction of an ensemble of neural network-based classifiers that optimize a diversity metric. During operation, the system defines a diversity metric based on pairwise angles between decision boundaries of three or more affine classifiers. The system includes the diversity metric as a regularization term in a loss function optimization for designing a pair (i.e., each pair) of mutually orthogonal affine classifiers of the three or more affine classifiers. The system trains one or more neural networks such that parameters of the one or more neural networks are consistent with parameters of the affine classifiers to obtain an ensemble of neural network-based classifiers which optimize the diversity metric.

In some embodiments, one backbone layer or one neural network kernel outputs an intermediate representation to the three or more affine classifiers.

In some embodiments, a plurality of backbone layers or a plurality of neural network kernels each output an intermediate representation to the three or more affine classifiers.

In some embodiments, the three or more affine classifiers comprise a multi-class classification layer.

In some embodiments, the three or more affine classifiers comprise a one-versus-all classification layer.

In some embodiments, the decision boundaries of the plurality of affine classifiers are pairwise within a predetermined threshold of being mutually orthogonal.

In some embodiments, the three or more affine classifiers comprise an odd number of affine classifiers. The system generates a decision based on an ensemble decision rule which takes as input results that are outputted by the odd number of affine classifiers.

In some embodiments, the system predicts an outcome for a testing data object based on the obtained ensemble of neural-network based classifiers which optimize the diversity metric.

In some embodiments, predicting the outcome for the testing data object is further based an ensemble decision rule.

In some embodiments, defining the diversity metric is further based on pairwise angles between decision boundaries of the three or more affine classifiers for training data, and training the one or more neural networks is further based on the training data.

BRIEF DESCRIPTION OF THE FIGURES

In the figures, like reference numerals refer to the same figure elements.

DETAILED DESCRIPTION

Figure 1:
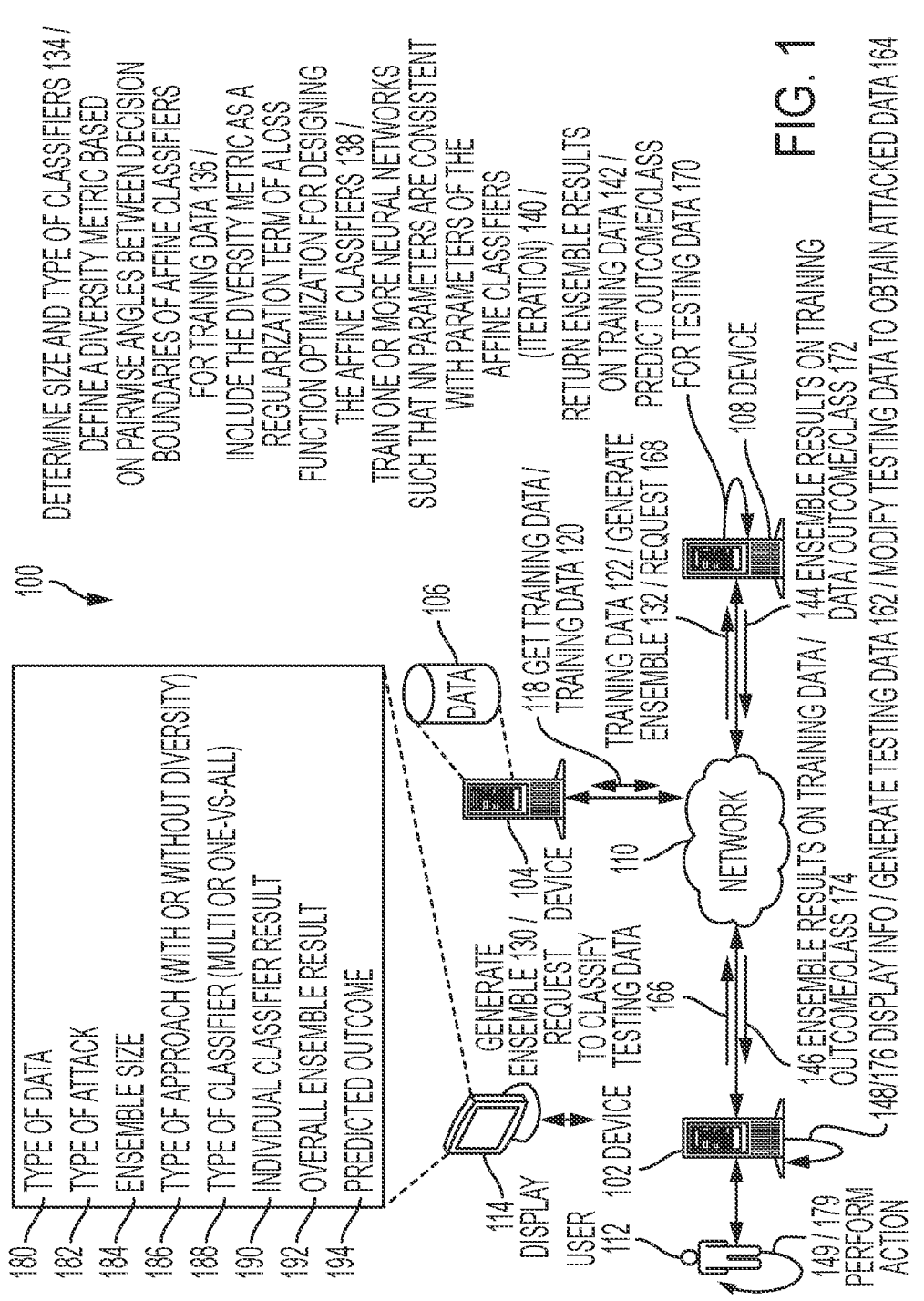
FIG. 1 presents an exemplary environment which facilitates construction of an ensemble of neural network-based classifiers that optimize a diversity metric, in accordance with an embodiment of the present application.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Introduction and Overview

The embodiments described herein solve the problem of addressing perturbation-bounded evasion attacks by providing a system which constructs an ensemble of neural network-based classifiers that optimizes a diversity metric and which can defend against misclassification.

As described above, adversarial machine learning examples can exploit the way that artificial intelligence algorithms work in order to disrupt the behavior of the algorithms. Recently, an increasing number and types of attacks have been devised in order to fool the algorithms, along with increasingly stronger defenses against such attacks. One large class of these attacks is "perturbation-bounded evasion attacks," which involve adversarial examples constructed by perturbing data samples with the goal of forcing a classifier to misclassify them. Such evasion attacks comprise a predominant class of attacks considered in current machine learning technology. One specific type of evasion attack involves adversarial examples which can be trivially classified by a human but can fool a machine learning classifier.

One solution to address these evasion attacks is to use an ensemble or collection of classifiers. For example, analyzing robustness against adversarial examples using linear models derived from convolutional neural networks (CNNs) is described in application Ser. No. 17/158,631. As another example, creating an ensemble of machine learning models to defend against adversarial examples is described in application Ser. No. 17/345,996. In another example, learning an ensemble of neural network classifiers by partitioning the training data randomly or by class is described in application Ser. No. 17/400,016.

However, these previous approaches did not maintain explicit control over the generated classifiers. A CNN can learn a complicated kernel such that the data is approximately linearly separable after the kernel mapping. Because this kernel cannot be expressed in the closed form, the kernel may be difficult to analyze and providing optimal classifier constructions may also be challenging. Thus, a principled analysis based on the CNN-derived linear models remains a challenge.

The embodiments described herein provide a system which addresses the above-described challenges by imposing diversity on the classifier itself and not based on, e.g., partitioning the training data as in application Ser. No. 17/400,016. The system can define a diversity metric based on pairwise angles between decision boundaries of a plurality of affine classifiers, specifically, between three or more affine classifiers and of an odd number of affine classifiers. The odd number of classifiers can allow for a definitive classification decision rule, e.g., using an ensemble decision rule. These decision boundaries can be mutually orthogonal or close to mutually orthogonal (e.g., within a predetermined threshold of being mutually orthogonal). That is, the pairwise angles can be 90 degrees (perpendicular) or close to 90 degrees (nearly perpendicular). The system can include the diversity metric as a regularization term in a loss function optimization for designing each pair of mutually orthogonal affine classifiers of the three or more affine classifiers (of an odd number), and the system can further train one or more neural networks to learn parameters of the one or more neural networks which are consistent with parameters of the affine classifiers to obtain an ensemble of neural network-based classifiers which optimize the diversity metric.

To make neural network-based models amenable to a diversity metric, the described embodiments replace the final classification layer of the neural network with the three or more affine classifiers of an odd number. As a result, the system can compute the angle between various classifiers, and specifically, between each pair of classifiers. Thus, for each class label, the system can construct an ensemble of one-versus-all affine classifiers using the diversity metric, as described below.

The system can learn the neural network weight via back propagation, using two approaches. The first approach is a "multi-head approach," in which the system trains a single neural network with multiple heads which represent the multiple diverse affine classifiers, as described below in relation to FIGS. 3 and 5. The second approach is a "multi-model approach," in which the system trains multiple neural networks such that their respective affine classifiers (in a pairwise manner) are mutually orthogonal or close to mutually orthogonal (e.g., within a predetermined threshold of being mutually orthogonal), as described below in relation to FIGS. 4 and 6.

High-Level Overview

Given a 2-class problem, e.g., panda and gibbon classes, consider an adversarial perturbation of a panda ("adversarial panda"). A first classifier may incorrectly classify this adversarial panda as a gibbon. The optimal adversarial perturbation may be to perturb the original image of the panda and generate the adversarial panda by moving the original image in a perpendicular manner to the decision boundary of the first classifier. A second classifier which is perpendicular to the first classifier would be unlikely to incorrectly classify the adversarial panda. The mutual orthogonality of the first classifier and the second classifier can thus result in the second classifier being robust to the adversarial perturbation which fooled the first classifier.

This principle can be extrapolated to the N-class problem such that each classifier is pairwise orthogonal with each other classifier (i.e., mutually orthogonal). Thus, a system which uses N mutually orthogonal classifiers can provide robust protection against adversarial manipulations which may address only one decision boundary as it is the case of a single linear model.

The principle of mutually orthogonal classifiers can apply in a case with linear or affine classifiers. In the case of neural networks or CNNs, the decision boundaries are not linear. A CNN can learn a complicated kernel such that the data is approximately linearly separable after the kernel mapping. While Gaussian kernels may be used to create a linear mapping of non-linear data, it may be more challenging to create this mapping in CNNs.

The described embodiments split the neural network into two parts. The first part includes all of the convolutional neural network layers which come before the classification layer. The second part is the classification layer itself, which outputs the decision. The system can feed this output decision from multiple classifiers into an ensemble decision model to obtain a final result, decision, or outcome. The described embodiments can address the above-described mapping issue by using back propagation to train the earlier layers of the CNN to behave in a certain manner.

Furthermore, as described below, an exactly mutual orthogonality may be less feasible or effective than a nearly mutual orthogonality. This "nearly mutual" (i.e., within a predetermined threshold of being exactly mutually perpendicular or orthogonal) concept can be defined by the diversity metric. The system can include the diversity metric as a regularization term in a loss function optimization for designing each pair of mutually orthogonal affine classifiers of the three or more affine classifiers (of an odd number), and the system can further train one or more neural networks to learn parameters of the one or more neural networks which are consistent with parameters of the three or more affine classifiers. This can result in obtaining an ensemble of neural network-based classifiers which optimize the diversity metric.

Exemplary Environment for Construction of
Ensemble of Classifiers to Defend Against
Adversarial Examples FIG. 1 presents an exemplary environment 100 which facilitates construction of an ensemble of neural network-based classifiers that optimize a diversity metric, in accordance with an embodiment of the present application. Environment 100 can include: a device 102, an associated user 112, and an associated display screen 114; a device 104 and an associated or included storage device 106; and a device 108. Devices 102, 104, and 108 can communicate with each other via a network 110. Device 102 can be a client computing device, e.g., a laptop computer, a mobile telephone, a smartphone, a tablet, a desktop computer, and a handheld device. Devices 102, 104, and 108 can be a computing device, e.g., a server, a networked entity, and a communication device.

During operation, device 108 can request training data from device 104, and device 104 can send training data to device 108 (via a get training data 118 communication and training data 120). Device 108 can receive training data 120 (as training data 122) and perform a series of operations to construct an ensemble of neural network-based classifiers which optimize a diversity metric to defend against adversarial examples. Upon receiving training data 122 (or a request to classify testing data 166 from user 112 via device 102), device 108 can determine the training data and also determine the size and type of classifiers to be generated (operation 134). Device 108 can define a diversity metric based on pairwise angles between decisions boundaries of affine classifiers for the training data (operation 136). The number of affine classifiers can be three or more and of an odd number. Device 108 can include the defined diversity metric as a regularization term of a loss function optimization for designing the affine classifiers (operation 138). Device 108 can then train one or more neural networks such that the parameters of the neural networks ("NN parameters") are consistent with parameters of the affine classifiers (operation 140), e.g., via iteration through forward and backward propagation. The number of neural network kernels to be trained can be either a single kernel with multiple final affine classifier layers (as in the "multi-head" approach described below in relation to FIGS. 3 and 5) or multiple kernels each with their own respective final affine classifier layer (as in the "multi-model" approach described below in relation to FIGS. 4 and 6). Device 108 can perform these operations, including training the neural network(s), based on the ensemble size (184), the type of approach (with or without diversity) (186), and the type of classifier as multiclass or one-versus-all (188), as determined by operation 134 and/or selected by user 112 via elements in display 114.

Device 108 can return the results of the ensemble of obtained classifiers on the training data (i.e., the classifiers which were obtained from training the one or more neural networks via iteration) (operation 142). Device 108 can send the result of the ensemble of classifiers on the training data to device 102 (as results 144). Device 102 can receive ensemble results on training data 144 (as results 146) and can perform a display information 148 operation, which can cause to be displayed on display 114 at least: the type of data 180 (e.g., whether the data is clean or based on an adversarial attack); the type of attack 182 (if the data type is data under attack, e.g., a fast gradient method (FGM) or a projected gradient descent (PGD) attack); the size of the ensemble 184 (the number of classifiers or final classification layers in the system); the type of approach used (e.g., with or without diversity) 186; the type of classifier used in the final classifier or classification layer (e.g., multiclass or one-versus-all) 188; the result from an individual classifier 190; and the overall ensemble result 192 (e.g., as based on an ensemble decision rule such as a majority vote or a maximum of an average of a probability of each class as reported by the individual models/classifiers). As an example, display 114 can include table 800, which is described below in relation to FIG. 8. The system can display any of the information described above on display 114, in any combination, which can allow user 112 to interact with display 114 to perform additional actions. While not depicted in FIG. 1, display 114 can also include table 900 of FIG. 9.

User 112 can view the information displayed on display 114 and can perform an action 149. For example, user 112 can change a configuration or setting related to, e.g., the type of data (180), the type of attack (182), the ensemble size (184), the type of approach (186), and the type of classifier (188). While not depicted in FIG. 1, user 112 can also change a setting related to the regularization term.

As another example, user 112 may interact with the information presented on display 114 to view detailed information about a specific set of results or ensemble of classifiers or classification result. In some embodiments, user 112 can select a certain set of classifiers of the displayed or presented ensemble of classifiers (e.g., to view more detailed information) and can also generate (via a user interface widget, not shown) and send a command to update the ensemble (similar to generate ensemble command 130).

Furthermore, user 112, via device 102, can determine or generate a testing data set, including a testing data object (e.g., via an operation 162). The testing data set (and the testing data object) can include data under attack, e.g., modified based on an adversarial technique. In some embodiments, device 102 (or user 112 via device 102) can modify or perturb the testing data to obtain attacked data (operation 164). Device 102 can send a corresponding request to classify the testing data (via a communication 166). Device 108 can receive the request to classify the testing data (as a request 168) and can predict an outcome/class for the testing data (operation 170). Operation 170 can include running the previously generated ensemble of classifiers on the testing data. The system can continue to train the one or more neural networks via iteration such that the parameters of the neural networks are consistent with the parameters of the affine classifiers (operation 140). This can result in increasing the robustness of the ensemble, which in turn can result in an increased accuracy for classification.

Device 108 can send a predicted outcome/class 172 to device 102. Device 102 can received predicted outcome/class 172 (as outcome/class 174) and can perform a display information 176 operation, which can cause certain information to be displayed on display 114, as described above in relation to operation 148. The information displayed on display 114 can further include a predicted outcome 194. Display 114 can also include, e.g., tables similar to those described below in relation to FIGS. 8 and 9.

User 112 can perform an action 179, which can be similar to action 149 as described above, e.g., changing a setting, interacting with displayed information, selecting certain classifiers, and generating a command to update the ensemble based on user-configured changes.

Principled Pairwise Diversity Metric for Multiple Affine Classifiers

The described embodiments can optimize the selection of component classifiers in an ensemble in order to achieve robustness to adversarial examples. This optimization can be driven by the diversity metric, which can quantify how different the component classifiers are from each other. If the classifiers are not diverse, their performance under adversarial perturbation may be similar. In contrast, classifiers which are diverse can exhibit adversarial robustness to different adversarial examples. As a result, combining the classification decisions into an ensemble decision rule can provide increased overall robustness. U.S. patent Ser. No. 17/944,939 describes a principled pairwise diversity metric for a pair of affine classifiers.

8

Let $F_1(\cdot)+b_1$ and $F_2(\cdot)+b_2$ be two c-class affine classifiers on, where $F_1$ and $F_2$ contain the weights and $b_1$ and $b_2$ are biases taken from the origin. The diversity metric can be defined as:

$$D(F_2; F_1) = \frac{|\langle F_1, F_2 \rangle|}{\|F_2\|\|F_1\|} \qquad \text{Eq. (1)}$$

This diversity metric as defined in Equation (1) (and further described in U.S. patent Ser. No. 17/944,939) can be used in the cost function of an optimization problem designed to yield a diverse ensemble of classifiers. For a two-classifier ensemble, this optimization problem can have a cost function which is composed of the loss functions incurred by each classifier and the pairwise diversity metric, as shown in the following equation:

$$\min_{F_1, b_1, F_2, b_2} \sum_{k=1}^{n} \{L_1(x_k, y_k) + L_2(x_k, y_k)\} + \lambda D(F_2; F_1) \qquad \text{Eq. (2)}$$

That is, the desired optimization problem for generating a diverse ensemble of two classifiers can be represented as:

$$\min_{F_1, b_1, F_2, b_2} \sum_{k=1}^{n} \{L(F_1 x_k + b_1 - y_k) + L(F_2 x_k + b_2 - y_k)\} + \qquad \text{Eq. (3)}$$
$$\lambda D(F_2; F_1)$$

Because the defined diversity metric is a pairwise diversity metric, the described embodiments can use an approach which generalizes the above optimization problem to multiple classifiers, i.e., to N classifiers, where N is three or more and where N is odd to allow for a definite classification decision rule. The system can accomplish this by including additional loss functions for the component classifiers in the ensemble, as well as the additional pairwise diversity terms.

For an ensemble of N classifiers, there may be N loss functions and $$\binom{N}{2}$$

pairwise diversity terms, each with its weight $\lambda_i$, where i=1, 2, . . . , $$\binom{N}{2}.$$

In some embodiments a single weight $\lambda$ can be used for all classifiers. Note that the output of the optimization problem can be the entire ensemble of affine classifiers, i.e., the classifiers are not designed incrementally one by one, but instead are generated all at once.

For each classifier $i \in N$ in the ensemble of classifiers, the optimization to learn the classifier parameters of $F_i$ can be expressed as:

$$\min_{F_i, b_i} \sum_{k=1}^{n} \{L(F_i x_k + b_i - y_k)\} + \lambda \sum_{j=1, j \neq i}^{N} D(F_j; F_i) \qquad \text{Eq. (4)}$$

Each classifier can include a regularization term which enforces orthogonality among its parameters and the parameters of the other classifiers in the ensemble. In Equation (4), the first term can be referred to as the loss term and the second term can be referred to as the regularization term. For example, given an ensemble of two classifiers where $i \in 2$, the classifiers' loss terms can be expressed as $L(F_1 x_k + b_1 - y_k)$ and $L(F_2 x_k + b_2 - y_k)$, and the regularization term can be expressed as $\lambda D(F_2; F_1)$. Both the first classifier and the second classifier can take into account the regularization term which can enforce orthogonality among its parameters (e.g., the parameters of the first classifier) and the parameters of the other classifiers in the ensemble (e.g., the parameters of the second classifier). This example of two classifiers can be extended as shown in Equation (4) to three or more classifiers of an odd number of classifiers. That is, the number of classifiers N in the ensemble can be three or more and of an odd number.

Thus, the diversity optimization formulation can ensure that affine classifiers become closer and closer to pairwise orthogonal as the value of the regularization parameter $\lambda$ is increased. This can ensure that when an adversarial perturbation moves a sample across a decision boundary of any given classifier, that movement is parallel to the decision boundary of the other classifiers, which can prevent misclassification by the other classifiers.

Diversity Optimization in Neural Network Kernels

As described herein, a neural network can learn an embedding from an input space into an output space, in which classification can be accurately performed. The layers of the neural network (except for the final fully connected classification layer) can compute an embedding (or an intermediate representation) of the input image, and the final classification layer can apply the classification function on the embedding (or the intermediate representation). The system can use a classification function of various types, such as a softmax classification with a cross-entropy loss function. Iterations of the softmax classifier can converge to a maximum margin classifier with the hinge loss function, which can be a bank of Support Vector Machines (SVMs). Specifically, the classification layer can include a group of one-versus-all binary linear SVM classifiers. As a result, the system or network can map the a class input sample into a different subspace, such that each class is nearly linearly separable from the other classes. The described embodiments can use linear SVMs or more generally can use affine classifiers.

Thus, the neural network can be viewed as a combination of a learned embedding mapping and a learned classifier. Assume a classification problem with C classes and a goal of an ensemble of N models. Beginning with a CNN with L layers with no distinction between a convolutional layer and a fully-connected network layer, the neural network can be viewed as an embedding mapping implemented on the first $L-1$ layers, followed by a classification layer composed of C one-versus-all linear or affine classifiers, as depicted below in relation to FIG. 2.

Figure 2:
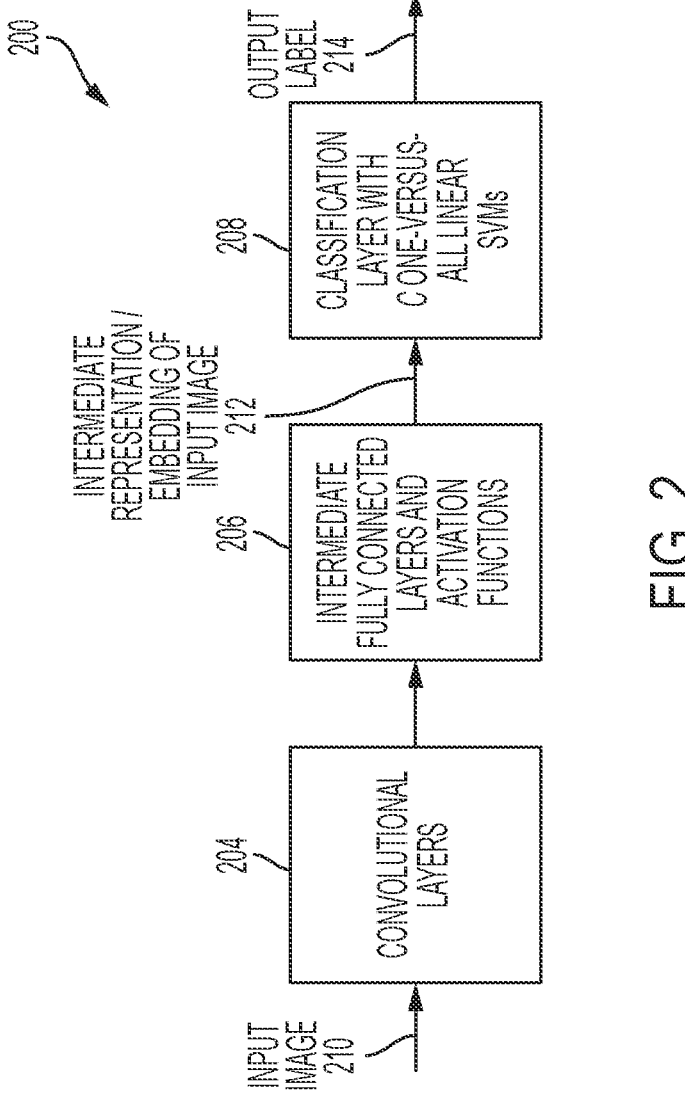
FIG. 2 presents an exemplary convolutional neural network (CNN) as a learned kernel and a classification layer which uses an affine classifier, in accordance with an embodiment of the present application.

FIG. 2 presents an exemplary convolutional neural network (CNN) 200 as a learned kernel and a classification layer which uses an affine classifier, in accordance with an embodiment of the present application. CNN 200 can include convolutional layers 204 and intermediate fully connected layers and activation functions 206. CNN 200 can also include a classification layer with C one-versus-all linear SVMs 208. CNN 200 can take as input an input image 210 and can output an intermediate representation/embedding of input image 212 from layers 206 as input to classification layer 208. Classification layer 208, based on its C one-versus-all linear SVMS, can subsequently output a result as an output label 214.

In general, the described embodiments can include a two-step approach to obtain diversity. First, the system can compute a diverse combination of N affine classifiers based on the diversity optimization technique described above, i.e., the system can define a diversity metric based on pairwise angles between decision boundaries of affine classifiers and include the diversity metric as a regularization term in a loss function optimization for designing the affine classifiers. Second, the system can learn the network embedding which is consistent with the N diversity-optimized linear classifiers, i.e., the system can train one or more neural networks such that parameters of the neural networks are consistent with parameters of the affine classifiers. The N diversity-optimized affine classifiers can comprise an ensemble of classifiers which are each learned using, in a customized classification layer, the loss function described above in Equation (4).

Creating Diverse Classifiers Based on a Single Neural Network or Multiple Diverse Neural Networks As depicted above in relation to FIG. 2, the output of the penultimate layer of the CNN can be an intermediate representation or embedding of the input image, i.e., a mapping of the input image via a neural network kernel. While this neural network kernel may not always be convenient to represent in closed form, it is still a learned neural network kernel. Given a trained neural network with a max margin classification layer with hinge loss, the neural network kernel can map the input image into an embedding space in which an affine classifier can be used with reasonable accuracy.

In the described embodiments, the embeddings of all the input images can be classified by the linear or affine classifier. The system can subsequently apply the diversity optimization formulation described above. Assume the embeddings are training data for an ensemble of affine classifiers. Using the diversity optimization formulation, the system can train N affine classifiers, where the classifier loss function can be regularized by the diversity metric. The combination of the first $L-1$ layers of the CNN and the diverse classifier layers are depicted below in relation to FIG. 3.

Figure 3:
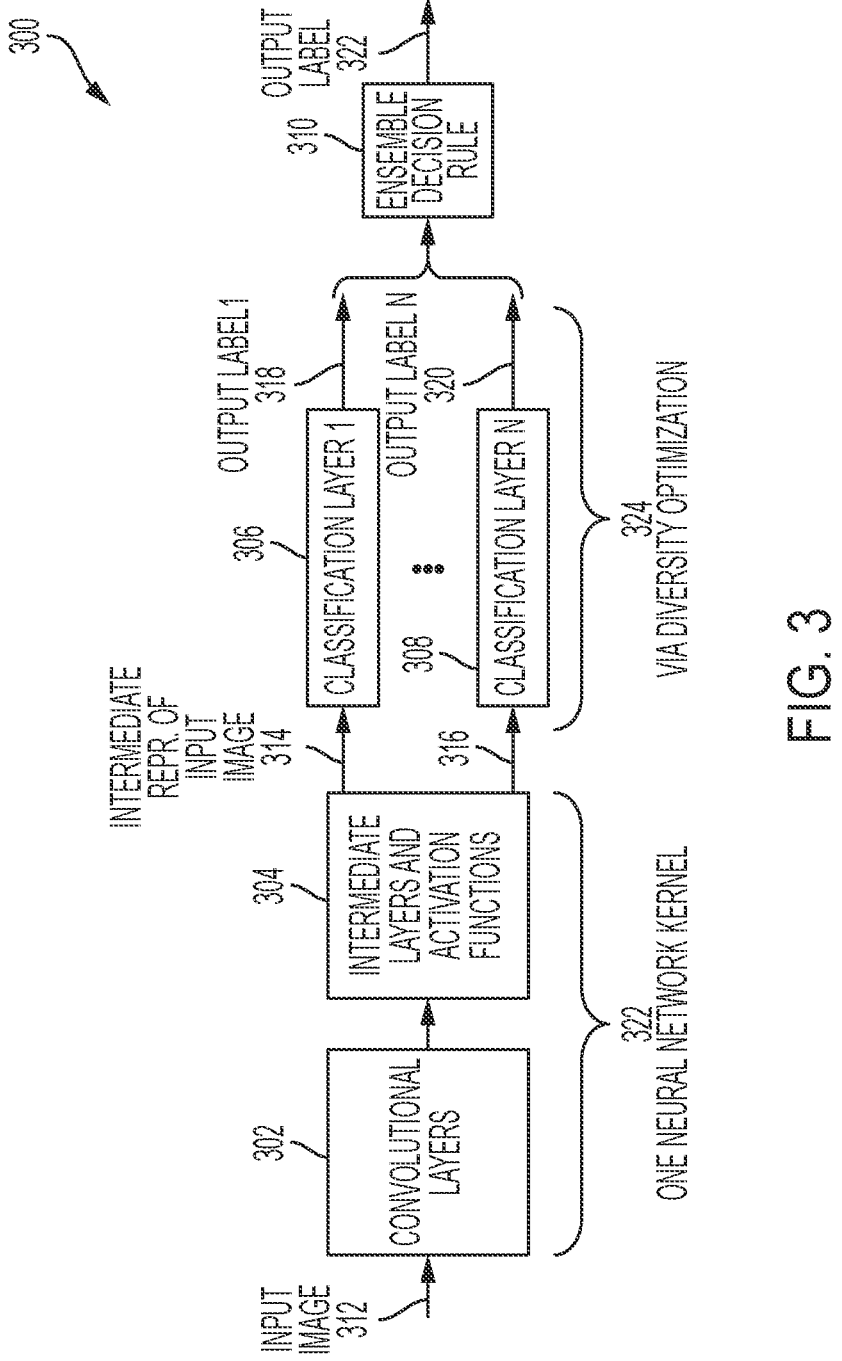
FIG. 3 presents an exemplary CNN as a learned kernel and classification layers which use multiple affine classifiers designed for the learned kernel, which incorporates diversity into the classification layer, in accordance with an embodiment of the present application.

FIG. 3 presents an exemplary CNN 300 as a learned kernel and classification layers which use multiple affine classifiers designed for the learned kernel, which incorporates diversity into the classification layer, in accordance with an embodiment of the present application. CNN 300 can include convolutional layers 302 and intermediate layers and activation functions 304. CNN 300 can also include multiple classification layers (e.g., a classification layer 1 306 and a classification layer N 308). CNN 300 can take as input an input image 312 and can output an intermediate representation/embedding of input image 314 and 316 from layers 304. Output 314 and 316 can be an input to, respectively, each of classification layers 1 306 and N 308. The intermediate representation/embedding of the input image (indicated as output 314 and 316) is generated from the single neural network kernel 322. Each classification layer can output its own result, e.g., classification layer 1 306 can generate an output label 1 318 and classification layer N 308 can generate an output label N 320. These multiple output labels can be input into an ensemble decision rule module 310, which can generate a decision of an output label 322.

CNN 300 illustrates how diversity is introduced in the classification layer (via diversity optimization 324), using only one fixed learned neural network kernel 322 (which includes layers 302 and 304). Because all the diverse affine classifiers of CNN 300 are based on the same embeddings (314 and 316), all the diverse affine classifiers are preceded by the same neural network kernel (322) and thus operate on the same embedding (314 and 316) of the input image. By itself, this step may not provide optimally sufficient diversity because the adversarial manipulation is applied not to the embeddings of the input images, but rather to the input images themselves. As a result, while the adversarial embedding does move in a direction perpendicular to the decision boundary of the affine classifier being attacked, creating such an embedding may involve a more complex manipulation of the underlying input image. This complex manipulation can occur in the first L−1 layers of the network.

Thus, it may be desirable to introduce diversity into the network in an end-to-end manner, i.e., both in the affine classification layer as well as in the embedding mapping, as described below in relation to FIG. 4. To introduce diversity into the embedding, the system must learn the embedding for each diverse classifier, which is equivalent to learning the weights of the neural network which produces those embeddings. While FIGS. 3 and 4 depict an even number of affine classifiers (as seen in classifications layers 306 and 308), the number of affine classifiers can be three or more and of an odd number, which can allow for a definite classification decision rule, e.g., using an ensemble decision rule.

Figure 4:
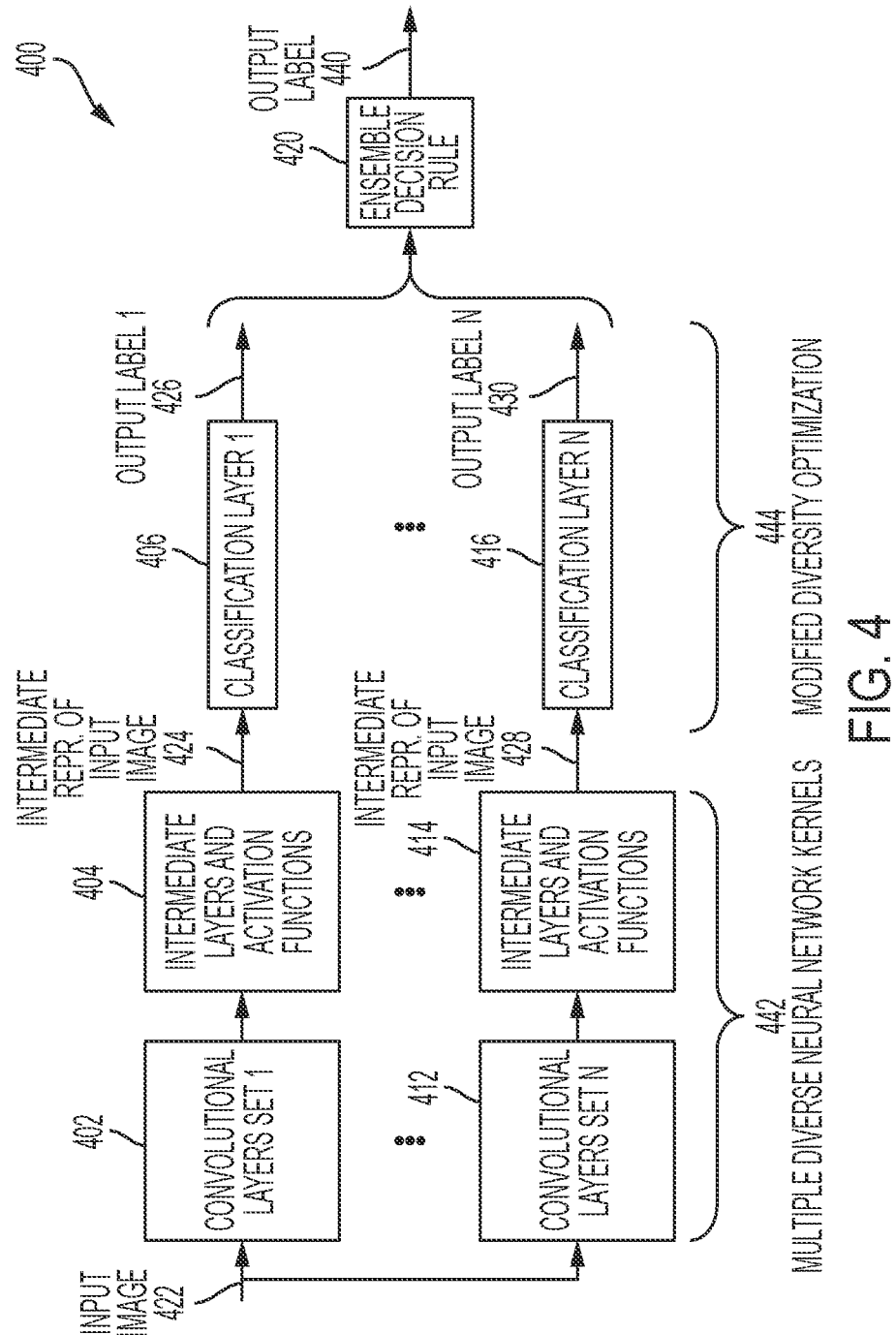
FIG. 4 presents an exemplary CNN as multiple learned kernels and corresponding classification layers, which incorporates diversity into both the classification layers and the learned kernels, in accordance with an embodiment of the present application.

FIG. 4 presents an exemplary CNN 400 as multiple learned kernels and corresponding classification layers, which incorporates diversity into both the classification layers and the learned kernels, in accordance with an embodiment of the present application. CNN 400 can include multiple "branches" each with a convolutional layers set, intermediate layers, and a classification layer. For example, CNN 400 can include convolutional layers set 1 402, intermediate layers and activation functions 404, and a corresponding classification layer 1 406, which can take as input an intermediate representation of input image 424 (based on input image 422) and generate an output label 1 426. Similarly, CNN 400 can also include convolutional layers set N 412, intermediate layers and activation functions 414, and a corresponding classification layer N 416, which can take as input an intermediate representation of input image 428 (also based on input image 422) and generate an output label N 430. As in CNN 300, the multiple output labels 426 and 430 can be input into an ensemble decision rule module 420, which can generate a decision or predicted outcome of an output label 440.

CNN 400 illustrates how diversity is introduced in both the classification layer (via modified diversity optimization 444) and the multiple diverse neural network kernels 442 (which includes the multiple branches of layers 402/404 and 412/414). The diverse affine classifiers of CNN 400 are based on different embeddings (e.g., 424 and 428), which are each preceded by a respective and different neural network kernel (e.g., 402/404 and 412/414) and thus generate different embedding mappings (e.g., 424 and 428) of input image 422.

Creating Diverse Neural Network Kernels Consistent with the Diversity-Optimized Affine Classifiers The system can extend the diversity optimization further backward into the neural network kernel, based on two different approaches. The first approach can involve learning the neural network parameters for a "multi-head" architecture in which the diverse neural networks share a common trunk of $\ell \leq L-1$ layers, as depicted below in relation to FIG. 5 and above in relation to FIG. 3. The second approach can involve learning the neural network parameters for a "multi-model" architecture in which the diverse networks do not share a common trunk, i.e., $\ell = 0$, as depicted below in relation to FIG. 6 and above in relation to FIG. 4. While these two approaches involve different architectures, both approaches are similar in the way in which the neural network parameters are learned.

Assume an ensemble of N neural network-based classifiers (e.g., CNNs) and C classes. Further assume that each classifier has L layers and the same dimensions for each layer. In a first step, the system can set up the diversity optimization problem such that the affine classifiers are designed with a pairwise diversity regularization term added to the conventional loss function of each classifier, as described above. Thus, for N classifiers, there can be $$\binom{N}{2}$$

diversity regularization terms.

In a second step, during each step of training the classifier, the system can obtain the classifier weights that minimize the regularized loss function.

In a third step, during each step of training the classifier, the system can also obtain the neural network parameters, i.e., the weights in each layer, via standard back propagation. This third step can be the same for the multi-head and the multi-model ensembling approaches. In the multi-head approach (as described below in relation to FIG. 5), this third step can result in the neural network parameters in the common backbone network that are consistent with each of the diverse classifiers. In the multi-model approach (as described below in relation to FIG. 6), this third step can result, in general, in different parameters in each of the L neural networks that are consistent with the respective N affine classifiers.

Multi-Head Approach

Figure 5:
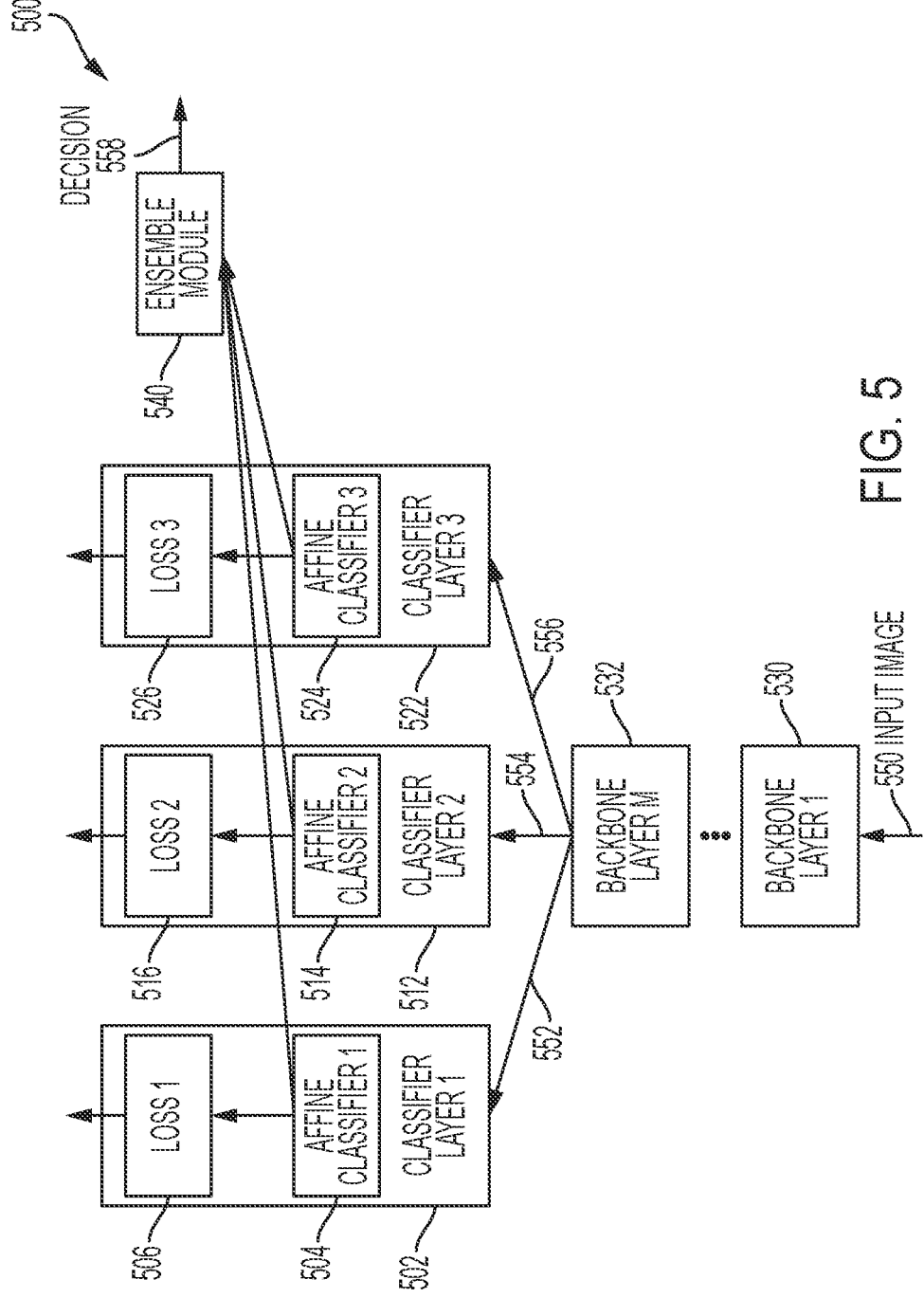
FIG. 5 presents an exemplary CNN which uses a multi-head approach with a learned kernel and classification layers which use multiple affine classifiers designed for the learned kernel, which incorporates diversity into the classification layer, in accordance with an embodiment of the present application.

FIG. 5 presents an exemplary CNN 500 which uses a multi-head approach with a learned kernel and classification layers which use multiple affine classifiers designed for the learned kernel, which incorporates diversity into the classification layer, in accordance with an embodiment of the present application. CNN 500 can include a set of backbone layers 1 530 to M 532, where M can be a number of layers L minus 1, which are shared by multiple classifiers. CNN 500 can take as input an input image 550, which, after being processed by the shared set of backbone layers, is fed into multiple classification or classifier layers as the same intermediate representation or embedding (indicated by 552, 554, and 556).

That is, the system can generate a different classification or classifier layer for each component classifier with as many as L−1 layers shared amongst the classifiers. The different classification or classifier layers can include, e.g.: a classifier layer 1 502, which includes an affine classifier 1 504 and a loss 1 function 506; a classifier layer 2 512, which includes an affine classifier 2 514 and a loss 2 function 516; and a classifier layer 3 522, which includes an affine classifier 3 524 and a loss 3 function 526. The system can learn the weights of all the layers in conjunction with the diversity optimization method described above. The class labels or results generated from the mutually exclusive orthogonal classifiers (504, 514, and 524) are input into an ensemble module 540, which generates a decision 558 based on, e.g., an ensemble decision rule.

Multi-Model Approach

Figure 6:
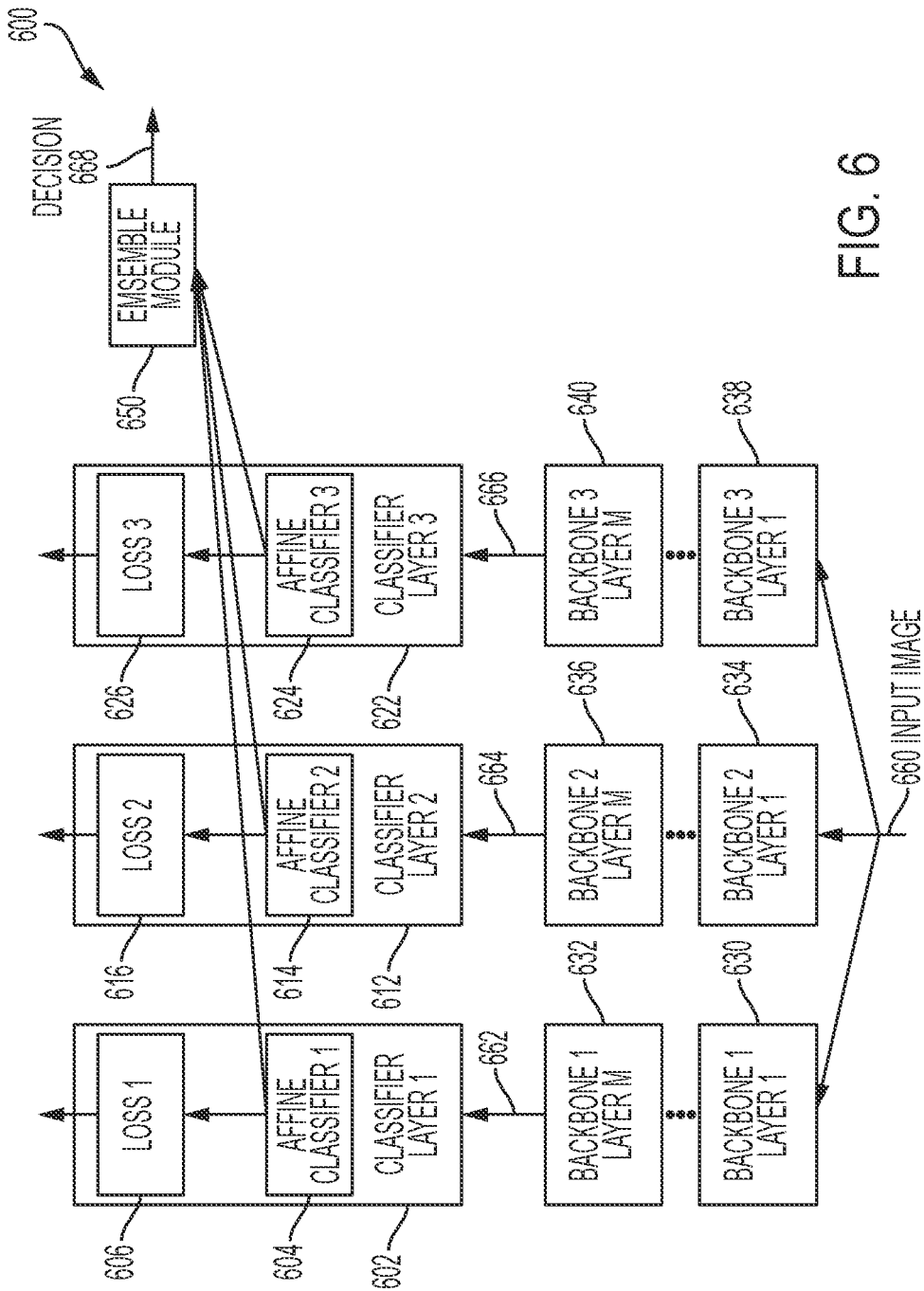
FIG. 6 presents an exemplary CNN which uses a multi-model approach with multiple learned kernels and corresponding classification layers, which incorporates diversity into both the classification layers and the learned kernels, in accordance with an embodiment of the present application.

FIG. 6 presents an exemplary CNN 600 which uses a multi-model approach with multiple learned kernels and corresponding classification layers, which incorporates diversity into both the classification layers and the learned kernels, in accordance with an embodiment of the present application. CNN 600 can include multiple sets of backbone layers, such as: backbone 1 layer 1 630 to backbone 1 layer M 632; backbone 2 layer 1 634 to backbone 2 layer M 636; and backbone 3 layer 1 638 to backbone 3 layer M 640, where M can be a number of layers L minus 1, and where each set of layers is not shared by multiple classifiers. CNN 600 can take as input an input image 660, which can be processed by each set of backbone layers, where each respective image can be subsequently fed into a respective one of multiple classification or classifier layers as different intermediate representation or embedding (indicated by 662, 664, and 666). That is, the system can generate a different classification or classifier layer for each component classifier where each set of max L–1 layers is not shared amongst the classifiers. The different classification or classifier layers can include, e.g.: a classifier layer 1 602, which includes an affine classifier 1 604 and a loss 1 function 606; a classifier layer 2 612, which includes an affine classifier 2 614 and a loss 2 function 616; and a classifier layer 3 622, which includes an affine classifier 3 624 and a loss 3 function 626. Similar to CNN 500 of FIG. 5, CNN 600 can learn the weights of all the layers in conjunction with the diversity optimization method described above. The labels or results generated from the mutually exclusive orthogonal classifiers 604, 614, and 624 are input into an ensemble module 650, which generates a decision 668 based on an ensemble decision rule.

Figure 7:
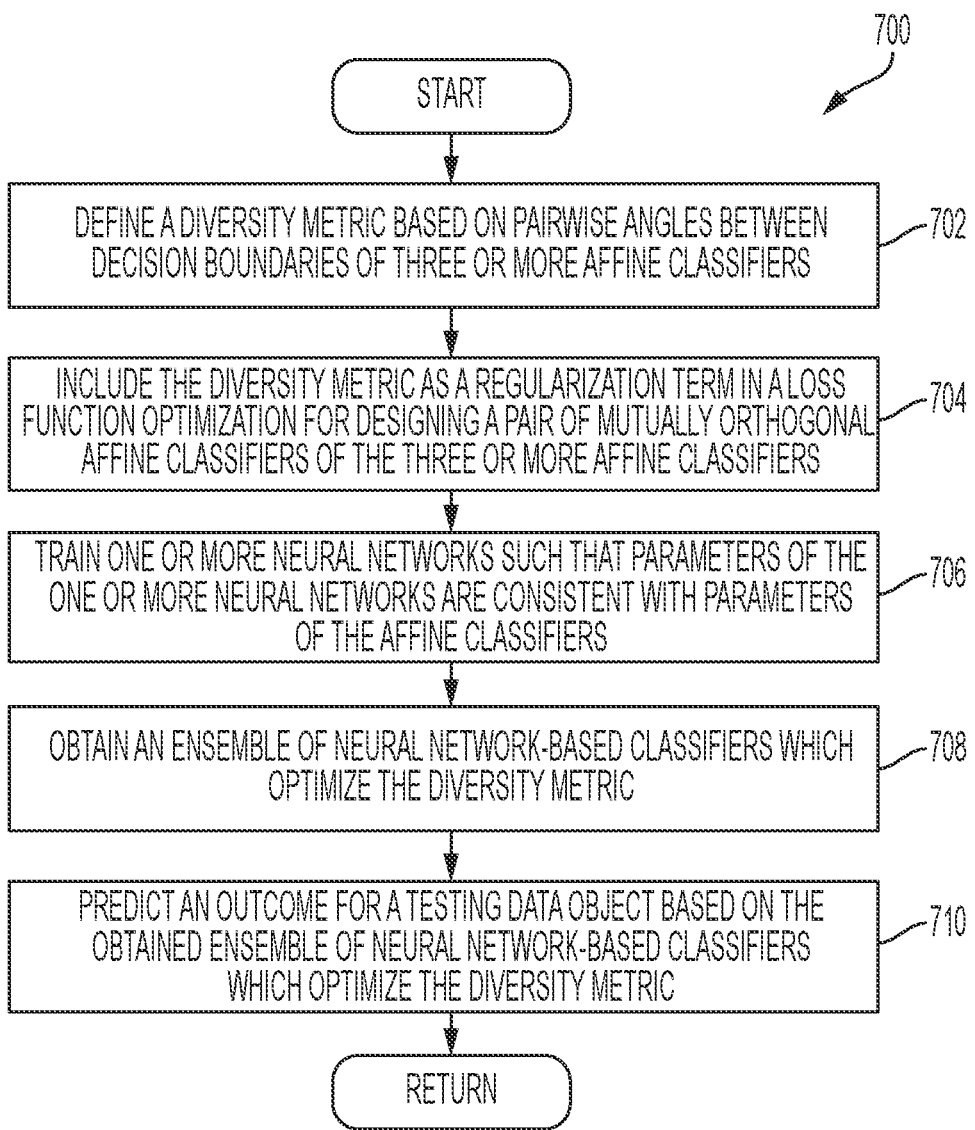
FIG. 7 presents a flowchart illustrating a method for facilitating construction of an ensemble of neural network-based classifiers that optimize a diversity metric, in accordance with an embodiment of the present application.

Method for Facilitating Construction of an Ensemble of Neural Network-Based Classifiers that Optimize a Diversity Metric FIG. 7 presents a flowchart 700 illustrating a method for facilitating construction of an ensemble of neural network-based classifiers that optimize a diversity metric, in accordance with an embodiment of the present application. During operation, the system defines a diversity metric based on pairwise angles between decision boundaries of three or more affine classifiers (operation 702). The decision boundaries of the plurality of affine classifier can be pairwise within a predetermined threshold of being mutually orthogonal (i.e., close to or nearly orthogonal). The system includes the diversity metric as a regularization term in a loss function optimization for designing a pair (i.e., each pair) of mutually orthogonal affine classifiers of the three or more affine classifiers (operation 704). The system trains one or more neural networks such that parameters of the one or more neural networks are consistent with parameters of the affine classifiers to obtain an ensemble of neural network-based classifiers which optimize the diversity metric (operation 706).

In one embodiment, one backbone layer or one neural network kernel can output an intermediate representation to the plurality of affine classifiers, as described in the multi-head approach of FIGS. 3 and 5. In another embodiment, a plurality of backbone layers or a plurality of neural network kernels can each output an intermediate representation to the plurality of affine classifiers, as described in the multi-model approach of FIGS. 4 and 6.

The system obtains an ensemble of neural network-based classifiers which optimize the diversity metric (operation

708). The system predicts an outcome for a testing data object based on the obtained ensemble of neural-network based classifiers which optimize the diversity metric (operation 710). The predicted outcome can also be based on, e.g., an ensemble decision rule.

Concrete Results

The following examples provide the results of implementing the diversity optimization process described above (in the sections titled "Creating Diverse Classifiers Based on a Single Neural Network or Multiple Diverse Neural Networks" and "Creating Diverse Neural Network Kernels Consistent with the Diversity-Optimized Affine Classifiers"), i.e., how constructing an ensemble of neural network-based classifiers that optimize a diversity metric can provide robustness against adversarial examples. The results can include diverse CNN-based models for classifying images from the MNIST and CIFAR-10 datasets.

The configuration parameters for the experiment results can include the following: adversarial attacks based on a fast gradient method (FGM) and a projected gradient descent (PGD); a perturbation space with a value of $\ell_\infty$ ball; a classifier type of CNNs with affine classification layer(s); a regularization parameter ($\lambda$) of 0.1, and a number of classifiers in each ensemble set to 1, 3, 5, and 7. A first dataset from MNIST can include: 60,000 training images; 10,000 test images; a perturbation budget ($\in$) of {0.05, 0.1, 0.2, 0.3}; and a number of training epochs set to 20. A second dataset from CIFAR-10 can include: 50,000 training images; 10,000 test images; a perturbation budget ($\in$) of {0.05, 0.1}; and a number of training epochs set to 20 for multi-class classifier ensembles and 40 for one-versus-all (binary) affine classifier ensemble.

Figure 8:
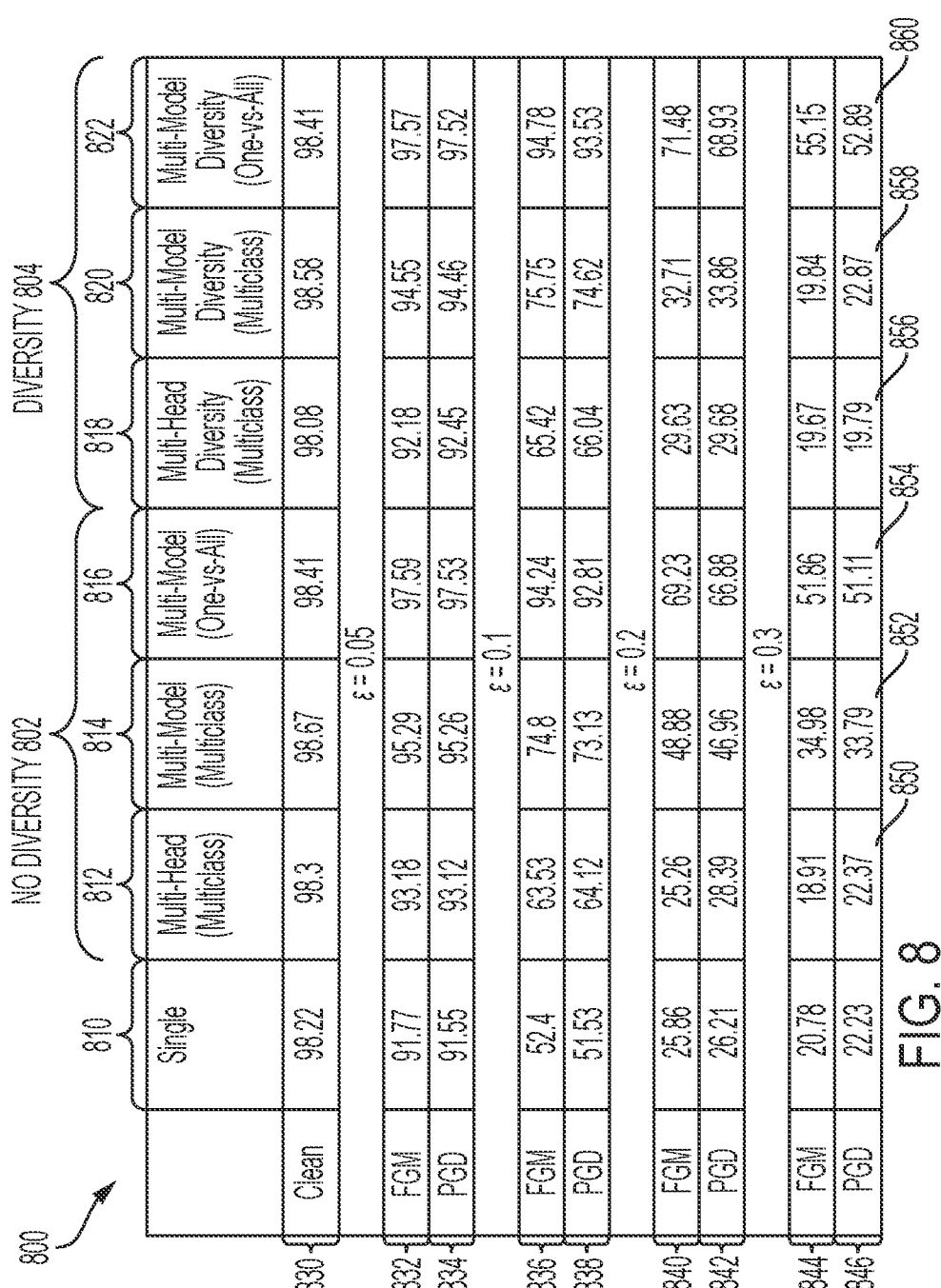
FIG. 8 depicts a table indicating exemplary results for ensemble robustness based on the MNIST dataset, in accordance with an embodiment of the present application.

FIG. 8 depicts a table 800 indicating exemplary results for ensemble robustness based on the MNIST dataset, in accordance with an embodiment of the present application. Table 800 indicates the effect of blackbox attacks on a 2-layer CNN at various perturbation budgets on the first dataset (from MNIST). Table 800 depicts the accuracy for single model and an ensemble size of seven models (i.e., "7-ensembles") for both a multiclass classification function as well as a bank of one-versus-all affine classification functions in the final layer of the CNN.

Table 800 presents results with diversity optimization in comparison with those for randomly initialized 2-layer CNNs (no diversity). This scheme can provide a more robust ensemble benchmark scheme compared to training an initial CNN and perturbing that trained CNN to generate an ensemble. A column 810 indicates results from using only a single classifier model. Columns 812, 814, and 816 show results from using, respectively, the multi-head approach (multiclass), the multi-model approach (multiclass), and the multi-model approach (one-versus all affine classifier). These three columns (indicated by a no diversity 802 label) do not use the diversity optimization described herein. The next three columns 818, 820, and 822 show results from using, respectively, the multi-head diversity approach (multiclass), the multi-model diversity approach (multiclass), and the multi-model diversity approach (one-versus-all). These three columns (indicated by a diversity 804 label) do use the diversity optimization described herein.

The results in table 800 are indicated in rows. A row 830 provides the results of each approach on clean data, while the results in the other rows provides pairs of results for FGM and PGD adversarial attacks based on different values of $\in$. For example: rows 832 and 834 indicate results from FGM and PGD attacks when $\in$=0.05; rows 836 and 838 indicate results from FGM and PGD attacks when $\in$=0.1;

rows 840 and 842 indicate results from FGM and PGD attacks when ∈=0.2; and rows 844 and 846 indicate results from FGM and PGD attacks when ∈=0.3.

Recall that in a traditional neural network, the system can generate a class label which indicates that a testing data object belongs to one of, e.g., C classes. In contrast, by using the one-versus-all affine classifiers in the described embodiments, the system can generate a label which is a binary value of each of the 1 to C classes, e.g.: whether the testing data object belongs to class 1 or does not belong to class 1; whether the testing data object belongs to class 2 or does not belong to class 2; etc. Using the results from the one-versus-all approach, the system can more accurately conclude whether a certain testing data object belongs to a certain class or not, e.g., by using the N binary classifiers where N=7*C in this example.

In table 800, it can be seen, e.g., in row 846, for the non-diversity approaches 802, that the multi-model one-versus-all approach column 816 yields a more accurate result (of 51.11, indicated by a result 854) than either the multi-head (multiclass) column 812 (of 22.37, indicated by a result 850) or the multi-model (multiclass) column 814 (of 33.79, indicated by a result 852). Similarly, it can be seen in row 846, for the diversity approaches 804, that the multi-model one-versus-all approach column 822 yields a more accurate result (of 52.89, as indicated by a result 860) than either the multi-head diversity (multiclass) column 818 (of 19.79, indicated by a result 856) or the multi-model diversity (multiclass) column 820 (of 22.87, indicated by a result 858).

Furthermore, the one-versus-all approaches which use diversity may also perform better than the approaches which do not use diversity, e.g., 52.89 (result 860) of the multi-model with diversity one-versus-all as compared to 51.11 (result 854) of the multi-model one-versus-all without diversity.

The baseline ensembles and the diversity-optimized ensembles can be compared in another way, by examining the angles between the decision boundaries of the corresponding affine classifiers in the ensemble, e.g., for the one-versus-all classifiers (taken pairwise) corresponding to a given class.

Figure 9:
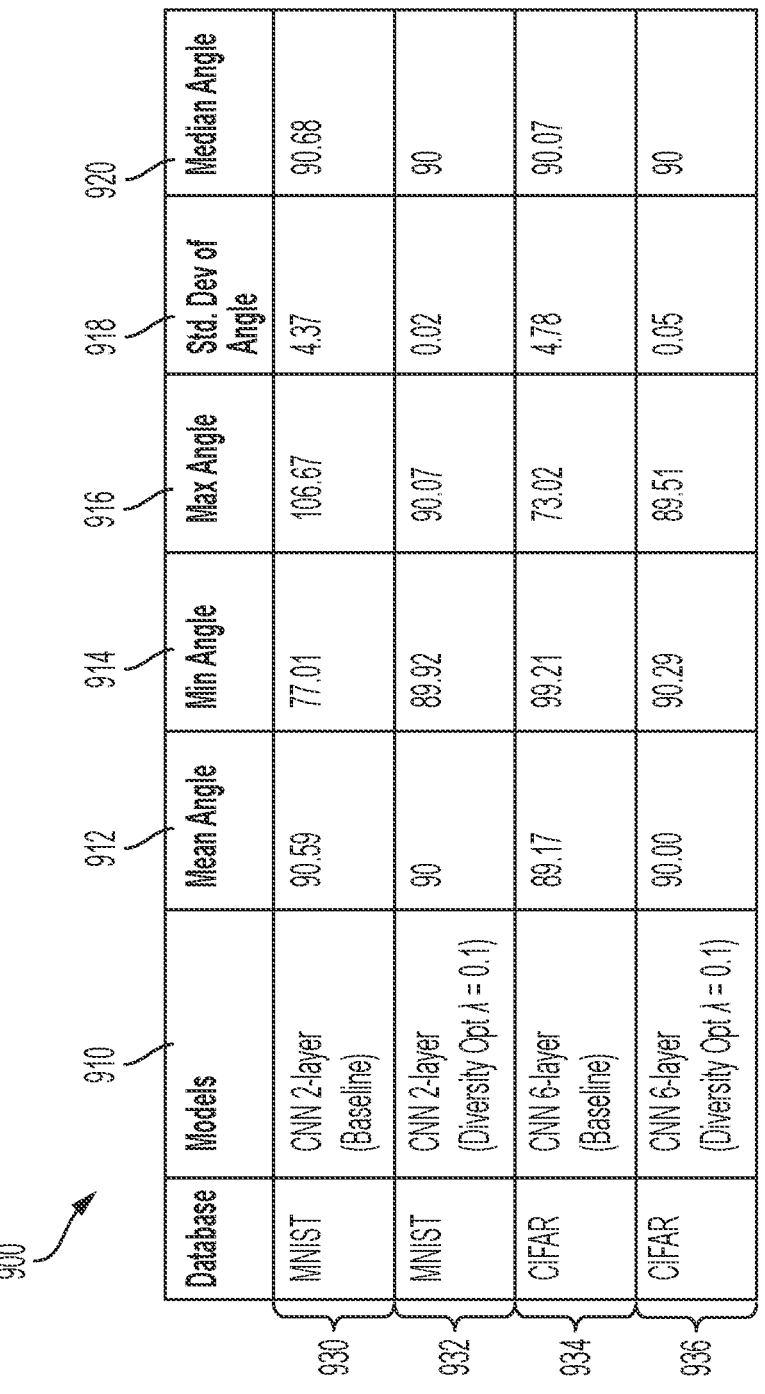
FIG. 9 depicts a table indicating exemplary results for pairwise angles between decision boundaries of the corresponding affine classifiers in various ensembles, in accordance with an embodiment of the present application.

FIG. 9 depicts a table 900 indicating exemplary results for pairwise angles between decision boundaries of the corresponding affine classifiers in various ensembles, in accordance with an embodiment of the present application. Table 900 can include: a row 930 for the MNIST dataset using a CNN 2-layer model as a baseline; a row 932 for the MNIST dataset using a CNN 2-layer model with diversity optimization where λ=0.1; a row 934 for the CIFAR dataset using a CNN 6-layer model as baseline; and a row 936 for the CIFAR dataset using a CNN 6-layer model with diversity optimization where λ=0.1. For each of these rows 930-936, table 900 can also include columns with the following information: a mean angle 912; a minimum angle 914; a maximum angle 916; a standard deviation of angle 918; and a median angle 920. The data in table 900 covers the statistics of the pairwise angles between the one-versus-all binary classifiers in the final classification layer of each respective model, i.e., for the baseline scheme (rows 930 and 934) and the diversity optimized scheme (rows 932 and 936).

The diversity-optimized schemes can result in pairwise angles that are tightly distributed around a mean of 90 degrees, with a small standard deviation around the mean (i.e., 0.02 and 0.05 for the diversity-optimized schemes of, respectively, MNIST row 932 and CIFAR row 936). In contrast, in the baseline schemes, the standard deviation around the mean as higher (i.e., 4.37 and 4.78 for the baseline and non-diversity optimized schemes of, respectively, MNIST row 930 and CIFAR row 934), since the classifier design step does not explicitly enforce orthogonality.

Even in the baseline schemes which do not use the diversity optimization, but instead involve training individual classifiers starting from a random initialization of network weights, the mean for the pairwise angles can be close to 90 degrees (e.g., 90.59 and 89.17 for the baselines and non-diversity optimized schemes of, respectively, MNIST row 930 and CIFAR row 934), even though, as noted above, the standard deviation is larger. Table 900 indicates that the randomly initialized classifiers may approximately achieve a similar orthogonality objective, as their performance in terms of adversarial robustness may be close to that of the diversity-optimized schemes, given the selected baseline as a stronger heuristic. Selecting a weaker heuristic, e.g., starting with a single trained classifier and subsequently computing the weights of the other classifiers as small random perturbations around the existing classifier weights, may not achieve the orthogonality condition, which would result in a lower robustness for the overall ensemble of classifiers.

Integration into a Practical Application and Improvements to Technologies

The embodiments described herein can be integrated into a practical application for, and can result in an improvement in, several technologies and technical fields, including but not limited to: artificial intelligence; machine learning and analytics; convolutional neural networks; data mining (including of a significant volume of data); data classification; and defense against adversarial attacks and adversarial examples, including perturbation-bounded evasion attacks.

Users of the system described herein can include an individual with a smartphone, a mobile device, or a computing terminal (e.g., user 112 of environment 100 of FIG. 1). Users of the system can also include any client in a machine learning or an artificial intelligence setting, where increasing the effectiveness of classifiers against adversarial attacks using the described diversity optimization can result in an increase in the accuracy of classification of test data. For example, the tables described above in relation to FIGS. 8 and 9 support the technological improvements of the described embodiments because the tables indicate results which the orthogonality condition can provide a more robust ensemble of classifiers against adversarial perturbations.

Furthermore, the described embodiments provide an improvement to technology because the system allows a user to interact with the created ensembles and resulting classifications (as shown in the exemplary information displayed in display 114 of FIG. 1). The system can result in more efficiently training the machine learning models against adversarial examples, which can result both in an improved model and a more efficient overall user experience.

Exemplary Computer and Communication System

Figure 10:
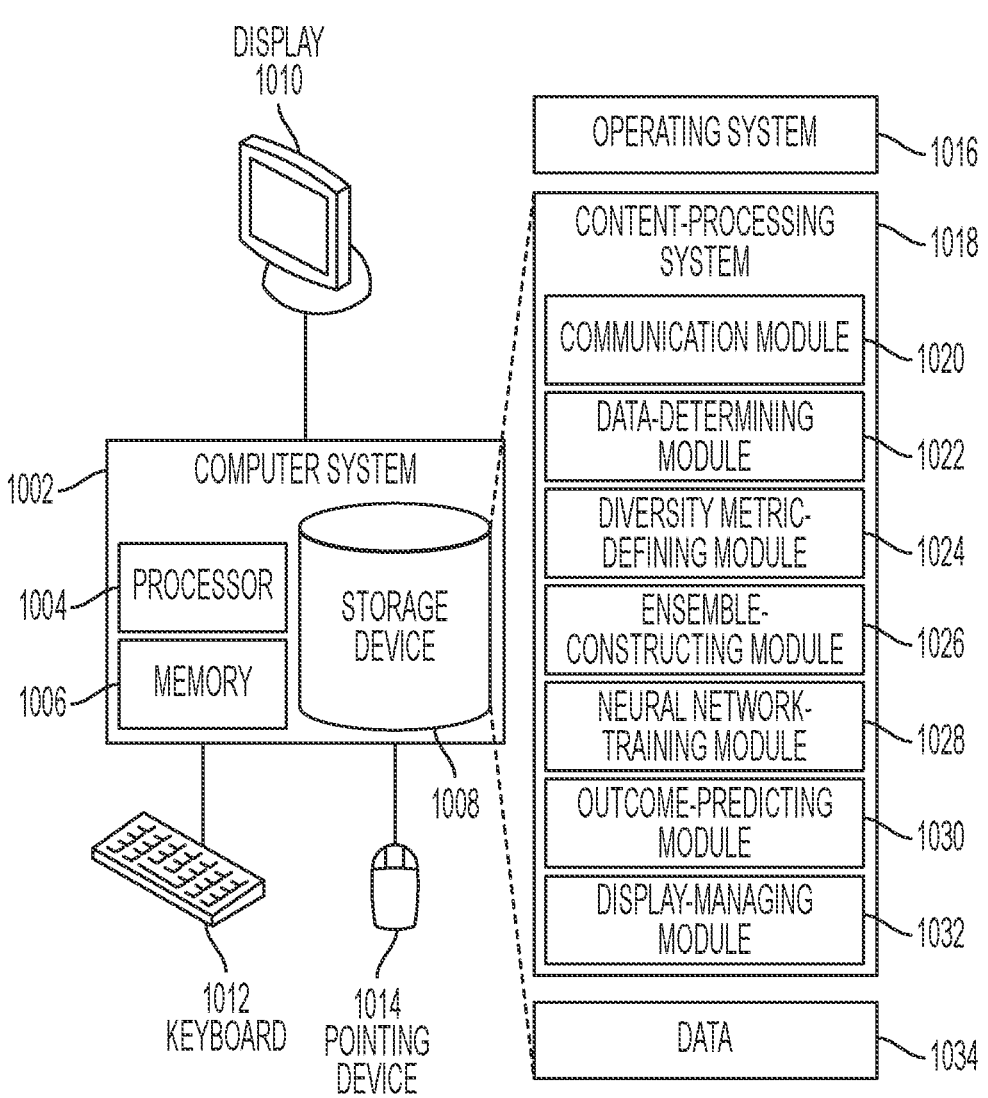
FIG. 10 presents an exemplary computer and communication system which facilitates construction of an ensemble of neural network-based classifiers that optimize a diversity metric, in accordance with an embodiment of the present application.

FIG. 10 presents an exemplary computer and communication system 1002 which facilitates data classification, in accordance with an embodiment of the present application. Computer system 1002 includes a processor 1004, a memory 1006, and a storage device 1008. Memory 1006 can include a volatile memory (e.g., RAM) that serves as a managed memory, and can be used to store one or more memory pools. Furthermore, computer system 1002 can be coupled to a display device 1010, a keyboard 1012, and a pointing device 1014. Storage device 1008 can store an operating system 1016, a content-processing system 1018, and data 1034.

Content-processing system 1018 can include instructions, which when executed by computer system 1002, can cause computer system 1002 to perform methods and/or processes described in this disclosure. Specifically, content-processing system 1018 may include instructions for sending and/or receiving data packets to/from other network nodes across a computer network (communication module 1020). A data packet can include data, a request, a command, a model, a classifier, training data, test data, a result, and an outcome.

Content-processing system 1018 can further include instructions for determining training data or testing data (data-determining module 1022). Content-processing system 1018 can further include instructions for defining a diversity metric based on pairwise angles between decision boundaries of three or more affine classifiers (diversity metric-defining module 1024). Content-processing system 1018 can include instructions for including the diversity metric as a regularization term in a loss function optimization for designing the a pair of mutually orthogonal affine classifiers of the three or more affine classifiers (ensemble-constructing module 1026). Content-processing system 1018 can additionally include instructions for training one or more neural networks such that parameters of the one or more neural networks are consistent with parameters of the affine classifiers to obtain an ensemble of neural network-based classifiers which optimize the diversity metric (neural network-training module 1028).

Content-processing system 1018 can also include instructions for predicting an outcome for a testing data object based on the obtained ensemble of neural-network based classifiers which optimize the diversity metric (outcome-predicting module 1030). Content-processing system 1018 can include instructions for displaying information on display 1010 or on a display associated with a user or computing device which is in communication with computer system 1002 (display-managing module 1032). Exemplary displayed information is described above in relation to, e.g., display 114 and operations 148, 149, 174, and 179 of FIG. 1. Content-processing system 1018 can also include instructions for allowing a user to interact with the displayed information (display-managing module 1032).

Data 1034 can include any data that is required as input or that is generated as output by the methods and/or processes described in this disclosure. Specifically, data 1034 can store at least: data; a set of data; a training data object; training data; test or testing data; a testing data object; an image; a perturbed image or data object; data which has been modified based on a perturbation-bounded evasion attack; a parameter; a regularization term; a loss function; an optimization of a loss function; a request; a command; a classifier; an affine classifier; a multi-class classification layer; a one-versus-all classification layer; an ensemble of classifiers; a diversity metric; a decision boundary; an angle; a backbone layer; a kernel; a neural network kernel; a neural network; a machine learning model; a CNN; an intermediate representation; an input; an output; a label; an outcome; a result; a predicted outcome or result; a rule; an ensemble decision rule; a classification; an accuracy of a classification; a size of an ensemble; a type of attack; a type of data; a type of approach; a type of classifier; a result from an individual classifier; an overall ensemble result; and a decision based on a rule.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executable method, comprising:

defining a diversity metric based on pairwise angles between decision boundaries of three or more affine classifiers;

including the diversity metric as a regularization term in a loss function optimization for designing a pair of mutually orthogonal affine classifiers of the three or more affine classifiers;

replacing a final classification layer in one or more neural networks with the three or more affine classifiers;

training, based on a training data object or a testing data object, the one or more neural networks such that parameters of the one or more neural networks are consistent with parameters of the affine classifiers to obtain an ensemble of neural network-based classifiers which optimize the diversity metric;

predicting an output for a respective data object based on the ensemble of neural network-based classifiers which optimize the diversity metric;

displaying, on a device associated with a user, information related to the predicted output for the respective data object, the information comprising one or more of:

a type of the respective data object, including whether the respective data object is clean or modified based on an adversarial attack;

a type associated with the adversarial attack, in response to the respective data object being modified based on an adversarial attack;

a size of the ensemble of neural network-based classifiers;

an approach associated with the respective data object, including whether the respective data object is associated with diversity;

a type of classifier used in a final classifier layer;

the predicted outcome based on a respective classifier; and an overall ensemble result;

receiving, based on an interaction by the user with the displayed information, a request to change a configuration related to one or more of the type of the respective data object, the type associated with the adversarial attack, the size of the ensemble of neural network-based classifiers, the approach associated with the respective data object, the type of classifier used in the final classifier layer, a selected classifier, and the regularization term;

predicting an updated outcome for the respective data object by updating the ensemble of neural network-based classifiers based on the changed configuration; and increasing accuracy of predicting the updated outcome based on the updated ensemble of neural network-based classifiers.

2. The method of claim 1, wherein one backbone layer or one neural network kernel outputs an intermediate representation to the three or more affine classifiers.

3. The method of claim 1, wherein a plurality of backbone layers or a plurality of neural network kernels each output an intermediate representation to the three or more affine classifiers.

4. The method of claim 1, wherein the three or more affine classifiers comprise a multi-class classification layer.

5. The method of claim 1, wherein the three or more affine classifiers comprise a one-versus-all classification layer.

6. The method of claim 1, wherein the decision boundaries of the three or more affine classifiers are pairwise within a predetermined threshold of being mutually orthogonal.

7. The method of claim 1, wherein the three or more affine classifiers comprise an odd number of affine classifiers, and wherein the method further comprises generating a decision based on an ensemble decision rule which takes as input results that are outputted by the odd number of affine classifiers.

8. The method of claim 1, further comprising:

predicting an outcome for a testing data object based on the obtained ensemble of neural-network based classifiers which optimize the diversity metric.

9. The method of claim 8, further comprising:

wherein predicting the outcome for the testing data object is further based an ensemble decision rule.

10. The method of claim 1, wherein defining the diversity metric is further based on pairwise angles between decision boundaries of the three or more affine classifiers for training data, and wherein training the one or more neural networks is further based on the training data.

11. A computer system for facilitating data classification, the computer system comprising:

a processor; and a storage device storing instructions that when executed by the processor cause the processor to perform a method, the method comprising:

defining a diversity metric based on pairwise angles between decision boundaries of three or more affine classifiers;

including the diversity metric as a regularization term in a loss function optimization for designing a pair of mutually orthogonal affine classifiers of the three or more affine classifiers;

replacing a final classification layer in one or more neural networks with the three or more affine classifiers;

training, based on a training data object or a testing data object, the one or more neural networks such that parameters of the one or more neural networks are consistent with parameters of the affine classifiers to obtain an ensemble of neural network-based classifiers which optimize the diversity metric;

predicting an outcome for a respective data object based on the ensemble of neural network-based classifiers which optimize the diversity metric;

displaying, on a device associated with a user, information related to the predicted outcome for the respective data object, the information comprising one or more of:

a type of the respective data object, including whether the respective data object is clean or modified based on an adversarial attack;

a type associated with the adversarial attack, in response to the respective data object being modified based on an adversarial attack;

a size of the ensemble of neural network-based classifiers;

an approach associated with the respective data object, including whether the respective data object is associated with diversity;

a type of classifier used in a final classifier layer;

the predicted outcome based on a respective classifier; and an overall ensemble result;

receiving, based on an interaction by the user with the displayed information, a request to change a configuration related to one or more of the type of the respective data object, the type associated with the adversarial attack, the size of the ensemble of neural network-based classifiers, the approach associated with the respective data object, the type of classifier used in the final classification layer, a selected classifier, and the regularization term;

predicting an updated outcome for the respective data object by updating the ensemble of neural network-based classifiers based on the changed configuration; and increasing accuracy of predicting the updated outcome based on the updated ensemble of neural network-based classifiers.

12. The computer system of claim 11, wherein one backbone layer or one neural network kernel outputs an intermediate representation to the three or more affine classifiers.

13. The computer system of claim 11, wherein a plurality of backbone layers or a plurality of neural network kernels each output an intermediate representation to the three or more affine classifiers.

14. The computer system of claim 11, wherein the three or more affine classifiers comprise at least one of a multi-class classification layer and a one-versus-all classification layer.

15. The method of claim 11, wherein the decision boundaries of the three or more affine classifiers are pairwise within a predetermined threshold of being mutually orthogonal.

16. The computer system of claim 11, wherein the three or more affine classifiers comprise an odd number of affine classifiers, and wherein the method further comprises generating a decision based on an ensemble decision rule which takes as input results that are outputted by the odd number of affine classifiers.

17. The computer system of claim 11, wherein the method further comprises:

predicting an outcome for a testing data object based on the obtained ensemble of neural-network based classifiers which optimize the diversity metric.

18. The computer system of claim 11, wherein defining the diversity metric is further based on pairwise angles between decision boundaries of the three or more affine classifiers for training data, and wherein training the one or more neural networks is further based on the training data.

19. A non-transitory computer-readable storage medium storing instructions that when executed by a computer cause the computer to perform a method, the method comprising:

defining a diversity metric based on pairwise angles between decision boundaries of three or more affine classifiers for training data;

including the diversity metric as a regularization term in a loss function optimization for designing a pair of mutually orthogonal affine classifiers of the three or more affine classifiers;

replacing a final classification layer in one or more neural networks with the three or more affine classifiers;

training, based on the training data, the one or more neural networks such that parameters of the one or more neural networks are consistent with parameters of the affine classifiers to obtain an ensemble of neural network-based classifiers which optimize the diversity metric;

predicting an outcome for a testing data object based on the obtained ensemble of neural-network based classifiers which optimize the diversity metric;

displaying, on a device associated with a user, information related to the predicted outcome for a respective data object, the information comprising one or more of:

a type of the respective data object, including whether the respective data object is clean or modified based on an adversarial attack;

a type associated with the adversarial attack, in response to the respective data object being modified based on an adversarial attack;

a size of the ensemble of neural network-based classifiers;

an approach associated with the respective data object, including whether the respective data object is associated with diversity;

a type of classifier used in a final classifier layer;

the predicted outcome based on a respective classifier; and an overall ensemble result;

receiving, based on an interaction by the user with the displayed information, a request to change a configuration related to one or more of the type of the respective data object, the type associated with the adversarial attack, the size of the ensemble of neural network-based classifiers, the approach associated with the respective data object, the type of classifier used in the final classification layer, a selected classifier, and the regularization term;

predicting an updated outcome for the respective data object by updating the ensemble of neural network-based classifiers based on the changed configuration; and increasing accuracy of predicting the updated outcome based on the updated ensemble of neural network-based classifiers.

20. The non-transitory computer-readable storage medium of claim 19, wherein the decision boundaries of the three or more affine classifiers are pairwise within a predetermined threshold of being mutually orthogonal, wherein at least one of the following:

one backbone layer or one neural network kernel outputs an intermediate representation to the three or more affine classifiers; and a plurality of backbone layers or a plurality of neural network kernels each output an intermediate representation to the three or more affine classifiers, and wherein the three or more affine classifiers comprise at least one of a multi-class classification layer and a one-versus-all classification layer.

* * * * *